US011301332B2

(12) United States Patent
Bandekar et al.

(10) Patent No.: US 11,301,332 B2
(45) Date of Patent: Apr. 12, 2022

(54) AUTOMATIC FIRMWARE UPGRADE OF AN EMBEDDED NODE

(71) Applicant: Honeywell International Inc., Morris Plains, NJ (US)

(72) Inventors: Raj Bandekar, Lansdale, PA (US); Brian Reynolds, Philadelphia, PA (US); Jethro Francis Steinman, Haverford, PA (US)

(73) Assignee: Honeywell International Inc., Charlotte, NC (US)

( * ) Notice: Subject to any disclaimer, the term of this patent is extended or adjusted under 35 U.S.C. 154(b) by 537 days.

(21) Appl. No.: 15/665,285

(22) Filed: Jul. 31, 2017

(65) Prior Publication Data

US 2019/0034291 A1    Jan. 31, 2019

(51) Int. Cl.
| | |
|---|---|
| G06F 11/14 | (2006.01) |
| G06F 8/65 | (2018.01) |
| G06F 16/27 | (2019.01) |
| G06F 11/16 | (2006.01) |
| G05B 19/042 | (2006.01) |
| G06F 11/20 | (2006.01) |

(52) U.S. Cl.
CPC ...... *G06F 11/1464* (2013.01); *G05B 19/0428* (2013.01); *G06F 8/65* (2013.01); *G06F 11/1662* (2013.01); *G06F 11/2038* (2013.01); *G06F 11/2048* (2013.01); *G06F 16/27* (2019.01); *G06F 11/2007* (2013.01); *G06F 11/2028* (2013.01); *G06F 11/2041* (2013.01); *G06F 2201/84* (2013.01)

(58) Field of Classification Search
CPC ........ G06F 11/1464; G06F 16/27; G06F 8/65; G06F 11/1662; G06F 11/2038; G06F 11/2048; G06F 11/2007; G06F 11/2028; G06F 11/2041; G06F 2201/84; G05B 19/0428
See application file for complete search history.

(56) References Cited

U.S. PATENT DOCUMENTS

| | | | |
|---|---|---|---|
| 7,120,690 B1* | 10/2006 | Krishnan | G06F 16/27 709/225 |
| 7,783,914 B1* | 8/2010 | Havemose | G06F 11/0709 714/4.11 |
| 2007/0168058 A1* | 7/2007 | Kephart | G06F 11/2028 700/82 |
| 2008/0192650 A1* | 8/2008 | Kolhi | H04L 41/00 370/254 |
| 2011/0119556 A1* | 5/2011 | de Buen | H04L 41/12 714/758 |
| 2016/0080353 A1* | 3/2016 | Jiang | H04L 63/06 726/12 |
| 2016/0132411 A1* | 5/2016 | Jolad | G06F 11/2046 714/6.3 |

* cited by examiner

*Primary Examiner* — Ashish Thomas
*Assistant Examiner* — Dustin D Eyers
(74) *Attorney, Agent, or Firm* — Paschall & Associates, LLC; James C. Paschall

(57) ABSTRACT

This disclosure provides an apparatus and method for use in industrial control systems and other systems. A method includes detecting, by a primary node, that a backup node is available and unconfigured. The method includes automatically replicating, by the primary node, the primary node to the backup node, including replicating a personality of the primary node to the backup node.

11 Claims, 3 Drawing Sheets

AUTOMATIC FIRMWARE UPGRADE OF AN EMBEDDED NODE

TECHNICAL FIELD

This disclosure relates generally to industrial systems. More specifically, this disclosure relates to embedded nodes in network systems, including but not limited to industrial networks.

BACKGROUND

Industrial systems can be implemented using networks of nodes that can be implemented as any number of devices. Many of these nodes are embedded, firmware-controlled devices that can experience failure or otherwise require upgrade or maintenance. Stable and redundant systems are desirable.

SUMMARY

This disclosure provides an apparatus and method for use in industrial control systems and other systems. A method includes detecting, by a primary node, that a backup node is available and unconfigured. The method includes automatically replicating, by the primary node, the primary node to the backup node.

Disclosed embodiments include a primary node comprising a controller and a memory, configured to perform processes as described herein. Disclosed embodiments also include a non-transitory machine-readable medium encoded with executable instructions that, when executed, cause one or more processors of a primary node to perform processes as disclosed herein.

In various embodiments, the method also includes querying, by the primary node, an identification from the backup node; receiving, by the primary node, the identification of the backup node; and verifying, by the primary node, that the identification corresponds to hardware compatible with the primary node. In various embodiments, the primary node and the backup node are connected to a same network, and are also connected via a redundant path. In various embodiments, the redundant path is a direct connection between the primary node and the backup node. In various embodiments, replicating the primary node includes sending a configuration to the backup node that causes the backup node to be configured according to the primary node. In various embodiments, replicating the primary node includes sending one or more applications by the primary node to the backup node for execution on the backup node so that the backup node replicates the operations of the primary node. In various embodiments, the method also includes activating the backup node to replace the primary node.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
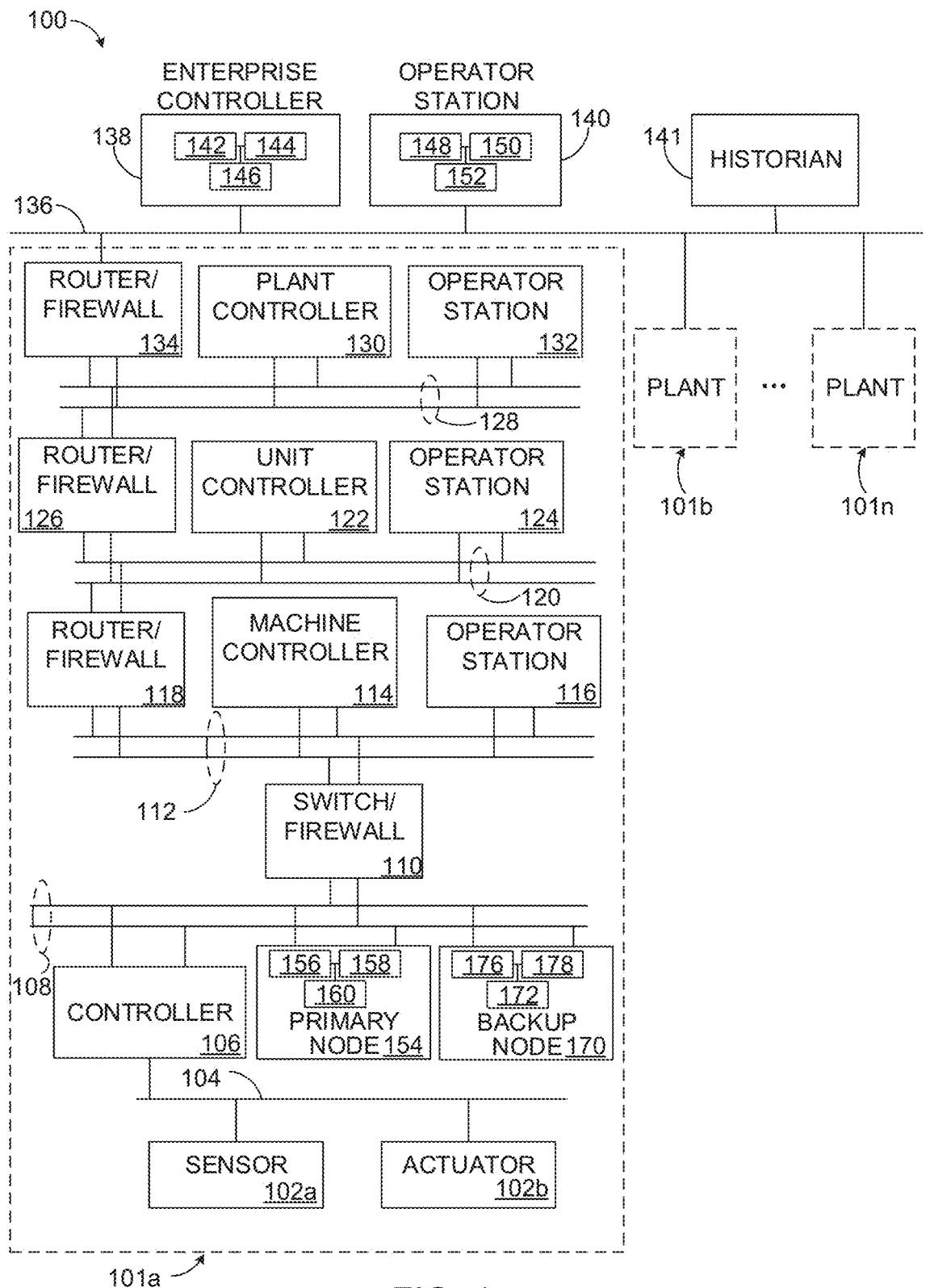
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s). In specific embodiments as discussed herein, network 104 is at least partially implemented as a wireless network, and sensors 102a and actuators 102b are at least partially implemented using wireless devices.

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

In many devices, the installed or embedded software on the device provides value more than the hardware itself. It can be necessary to repurpose the hardware using different software personalities to serve specific applications. Applications that require high availability can be served by a redundant pair of embedded nodes, referred to herein as a "primary node" and a "backup node." Such redundant nodes should be identical in terms of the redundant functions, however there could several different applications served by other such twin nodes where all such twin nodes are derived from a common hardware platform. It is difficult to predict hardware failures against specific software applications. These nodes, or the applications running on the nodes, can perform any suitable functions, such as performing as I/O devices, controllers, interface modules, network gateways, bridges, etc.

One approach to address potential failures is to stock hardware modules by preprogramming application software on specific backup hardware. Often the ordered hardware may come with an application that is not at the current revision level. The replacement node for a failed module has to be up and running very quickly with minimum user intervention, and "backstocking" redundant hardware is often ineffective.

In highly-available systems, a backup node can serve as a standby in case of failure of the primary node. This backup node takes over as primary when the current primary node fails. When replacing the failed node, many times the new node is not at the same firmware level. In situations where a common hardware platform is used as a single stocking unit, such a stocking unit has to be loaded with the appropriate level of firmware to be a twin of the running primary before it can be purposed for standby backup. The procedure to make a standby backup or bring it to the same firmware level as primary often involve a human intervention of loading the node configuration or image from an engineering tool.

A standby node can also include a "hot standby" node. A hot standby backup node is typically a fully synchronized node to the primary node such that it is ready to take over in the event of failure of the primary within a period of time short enough that the condition of the controlled process is not substantially impacted by the temporary loss of control.... For a node to be hot standby, it should not only be at the compatible or the twin firmware revision and but also the configuration data of the hot standby node should be exact to the primary node, and the dynamic state data of the hot standby node should be exact to the primary node. Disclosed embodiments also can transfer the basic firmware "personality," not only configuration data. As used herein, the "personality" refers to the relevant programs, operating system, flash images, and other data to make the standby node a duplicate in functional terms of the primary node. By transferring the entire personality, the primary node effectively performs an automatic firmware upgrade, to the extent necessary, of the standby node to match the primary node.

Disclosed embodiments include processes in which a primary node can auto-detect the presence of a backup node on the network, ensure that the backup node is of the same hardware platform (or an acceptable replacement), such as by the virtue of a hardware signature, and thereafter configure the backup node using its configuration.

Processes and results described herein can be accomplished (among other ways) using embedded nodes. Any of the controllers or other devices illustrated in FIG. 1 can be used as a primary node or backup node as described herein. For purposes of illustration, primary node 154 and backup node 170, connected to network 108, are described as an example of the disclosed processes. Further, while the specific examples below describe a single backup node to a given primary node as a redundant pair, various embodiments can include multiple backup nodes to a primary node for a 1:n redundancy.

In this example, each primary node 154 includes one or more processing devices 156; one or more memories 158 for storing instructions and data used, generated, or collected by the processing device(s) 156; and at least one network interface 160 (wired, wireless, or a combination of these). Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the primary node 154 could be implemented using any suitable hardware or a combination of hardware and software/firmware instructions.

In this example, the backup node 170 includes one or more processing devices 176; one or more memories 178 for storing instructions and data used, generated, or collected by the processing device(s) 176; and at least one network interface 172. Each processing device 176 could represent a microprocessor, microcontroller, digital signal process, field programmable gate array, application specific integrated circuit, or discrete logic. Each memory 178 could represent a volatile or non-volatile storage and retrieval device, such as a random access memory or Flash memory. Each network interface 172 could represent an Ethernet interface, wireless transceiver, or other device facilitating network communication. The functionality of the backup node 170 could be implemented using any suitable hardware or a combination of hardware and software/firmware instructions. The backup node 170 can be, for example, a stand-alone data processing system, a mobile device, a system or device controller, or otherwise, and is generally configured to perform actions as described herein to act as a redundant or backup node to primary node 154, and is preferably of the same or equivalent hardware construction as the primary node 154. The exemplary structure of the backup node 170 described above is not intended to limit the structure or function of the devices that could be used to implement the backup node 170.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the primary node 154 and backup node 170 can be used. This functionality can be used in any other suitable device or system.

Figure 2:
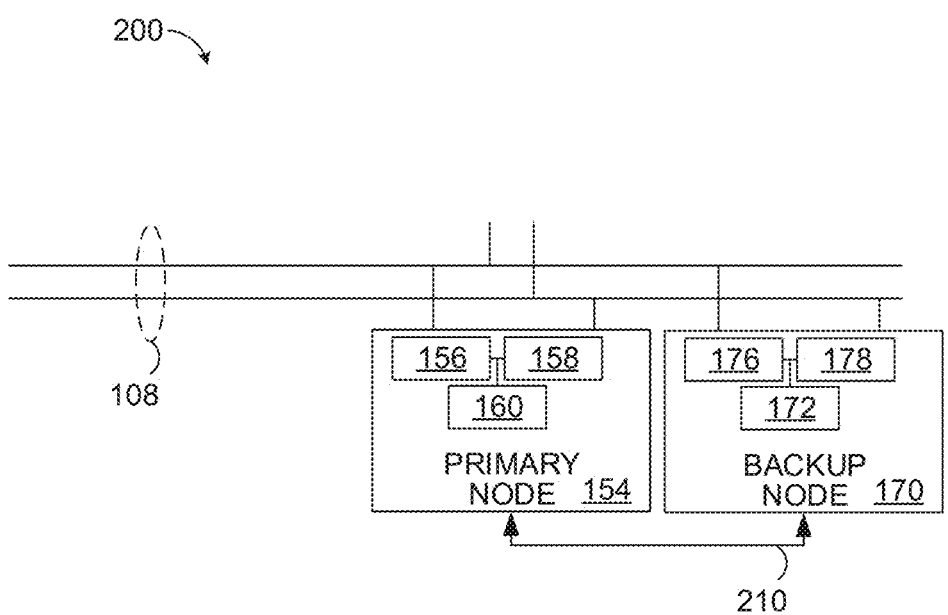
FIG. 2 illustrates an embodiment of a redundant node system including a primary node and a backup node in accordance with disclosed embodiments.

FIG. 2 illustrates an embodiment of a redundant node system 200 where primary node 154 and backup node 170, including the other elements as illustrated in FIG. 1, are connected by a primary network 108, as in FIG. 1, and are also connected by a redundant path 210. According to various embodiments, the specific communications described below between primary node 154 and backup note 170 can be performed over network 108 or over redundant path 210. Redundant path 210 can be implemented, for example, as a separate wired or wireless network or by other wireless or wired connections, such as WiFi, USB, Ethernet, or other serial, parallel, packet-based, or other direct or indirect connection. By separating redundant path 210 from primary network 108, in specific implementations, the backup node 170 is not required to have a separate address or other configuration on primary network 108 until or unless it is activated in place of primary node 154.

Figure 3:
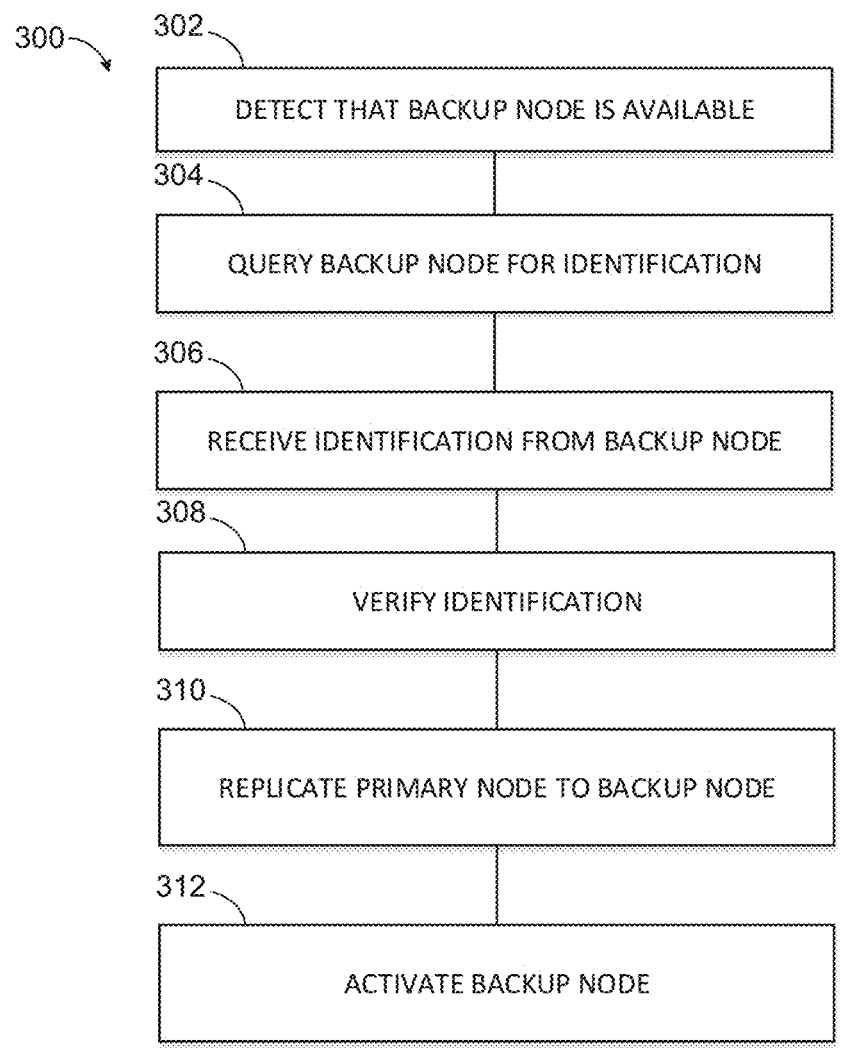
FIG. 3 illustrates a process in accordance with disclosed embodiments.

FIG. 3 illustrates an example a process 300 performed by a primary node 154 in accordance with disclosed embodiments.

According to disclosed embodiments, primary node 154 can detect that backup node 170 is available (that is, connected so that primary node 154 can communicate with it) and unconfigured (302). Such detection can be based, for example, on a signal level on a backplane (which can include redundant path 210), detecting a broadcast from the backup node 170 over network 108, detecting a configuration message or other message from backup node 170 over network 108 or redundant path 210, detecting the physical connection of backup node 170 to redundant path 210, or otherwise. The primary node 154 and backup node 170 can be connected to the same network, and can also be connected via the redundant path 210.

Primary node 154 can then query the backup node 170 for an identification (304), such as a hardware signature (e.g., a hardware version), model number, or other identifier.

Primary node 154 receives the identification from backup node 170 (306).

Primary node 154 verifies that the identification corresponds to hardware compatible with the primary node 154 (308). In various embodiments, this can include verifying that the identification of the backup node 170 indicates that it is identical hardware as primary node 154, that it is non-identical but functionally compatible hardware as primary node 154, that it is an emulation (such as a virtual-machine or virtual-device emulation) of hardware that is identical to or functionally compatible with primary node 154, or otherwise able to execute the same processes and functions as a backup to primary node 154. This step can include verifying that the identification corresponds to hardware that the primary node 154 is capable of and authorized to use as a backup node.

If no compatible hardware is found, the process can end.

If a compatible hardware is found, primary node 154 automatically replicates itself to the backup node (310). This can include sending a command or commands from the primary node 154 to the backup node 170 that causes the backup node 170 to initiate a boot sequence. This can include sending a personality from the primary node 154 to the backup node 170 that causes the backup node 170 to configure the backup node 170 to the primary node's personality or otherwise be configured according to the primary node. This can include sending one or more applications from the primary node 154 to the backup node 170 for execution on the backup node 170 so that it replicates the operations of the primary node 154. This can include, in particular, sending a boot image, such as a first and second stage boot loader, to the backup node 170, followed by commands for the backup node to perform a boot sequence. This can include the primary node copying one or more application or node images to the backup node. The replication can be performed over the network connection or over the redundant path.

Replication can include performing any necessary checks to ensure that the replication is performed intelligently. For example, the primary node 154 can determine whether a given primary node application already exists on the backup node, whether of the same version or a newer version, and not transfer that application.

The backup node 170 is activated (312). This activates the backup node to a state of a "twin" or duplicate personality to the primary node, which also functions to perform an automatic firmware upgrade as necessary. In some cases, the primary node 154 can itself activate the backup node 170. In other cases, the backup node 170 can be configured to automatically activate when it detects that the primary node is failed or missing, whether over a network connection or the redundant path.

In other embodiments, the backup module may be unable to communicate to the primary because the application does not support the necessary protocol. In such cases, or in other hardware-based embodiments, the primary node identifies the backup node as present and attempts to communicate with the backup node. If these communications fail and the primary node is unable to communicate with the backup node, the primary node can automatically replicate its personality and applications using techniques as described herein.

Disclosed embodiments provide technical improvements or advantages over systems where loading the configuration to a backup node requires that the user ensures that a compatible version of software configuration is available, a separate engineering tool is required to load the software configuration, and a separate bench system must be used to prepare the new module before it is added to or available in the production system. Disclosed embodiments provide a "plug-and-play" approach where the user of the product does not have to worry about the availability of software application type or version and will always be guaranteed to have the same configuration as its primary partner. Technical benefits include a guaranteed synchronization of data between the primary node and the backup node, providing peace of mind to the customer in the case of a failed module. Another technical benefit can include performing processes as disclosed herein over a redundancy path without an IP address assignment on the primary network. This allows less dependency on specific node addressing schemes such as IP address assignment via DHCP or BootP as a minimum to access the node to which new firmware is supposed to be loaded but instead provides flexibility to use any other low-level detecting and addressing schemes.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The various components, elements, or steps described above can be duplicated, omitted, or repeated in various embodiments, and no element or step should be considered essential unless specifically claimed.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   detecting, by a primary node, that a backup node 1s available and unconfigured, the primary node and the backup node connected to a network and to a separate redundant path, that connects the primary node directly to the backup node, wherein the step of detecting the backup node includes at least one of:
   detecting a signal level on a backplane,
   detecting a broadcast from the backup node,
   detecting a configuration message from the backup node, and
   detecting the physical connection of the backup node to the redundant path;
   upon detecting the backup node;
   querying, by the primary node, for an identification from the backup node;

receiving, by the primary node, the identification of the backup node;

verifying, by the primary node, that the identification corresponds to hardware compatible with the primary node, wherein the identification indicates at least one of:
  identical hardware as the primary node,
  non-identical but functionally compatible hardware as the primary node, and
  an emulation of hardware that is identical to or functionally compatible with the primary node;

automatically replicating, by the primary node, the primary node to the backup node, including replicating a personality of the primary node to the backup node, wherein the step of the automatic replicating includes:

sending a boot image to the back-up node followed by a command from the primary node to the backup node to initiate a boot sequence, sending one or more applications from the primary node to the backup node for execution on the backup node to replicates the personality and the operations of the primary node.

2. The method of claim 1, wherein the personality includes a configuration that causes the backup node to be configured according to the primary node.

3. The method of claim 1, wherein the personality includes one or more applications for execution on the backup node so that the backup node replicates operations of the primary node.

4. The method of claim 1, further comprising activating the backup node to replace the primary node.

5. A primary node, comprising:
  a controller;
  a memory;
  the controller configured to:
  detect that a backup node is available and unconfigured, the primary node and the backup node connected to a network and to a separate redundant path that connects the primary node directly to the backup node, wherein the step of detecting the backup node includes at least one of:
    detecting a signal level on a backplane,
    detecting a broadcast from the backup node,
    detecting a configuration message from the backup node, and
    detecting the physical connection of the backup node to the redundant path;
  upon detecting the backup node;
  query an identification from the backup node;
  receive the identification of the backup node;
  verify that the identification corresponds to hardware compatible with the primary node, wherein the identification indicates at least one of:
    identical hardware as the primary node,
    non-identical but functionally compatible hardware as the primary node, and
    an emulation of hardware that is identical to or functionally compatible with the primary node;
  automatically replicate the primary node to the backup node, including replicating a personality of the primary node to the backup node, wherein the step of the automatic replicating includes:
  sending a boot image to the back-up node followed by a command from the primary node to the backup node to initiate a boot sequence,
  sending one or more applications from the primary node to the backup node for execution on the backup node to replicates the personality and the operations of the primary node.

6. The primary node of claim 5, wherein the personality includes a configuration that causes the backup node to be configured according to the primary node.

7. The primary node of claim 5, wherein the personality includes one or more applications for execution on the backup node so that the backup node replicates operations of the primary node.

8. The primary node of claim 5, wherein the backup node is activated to replace the primary node.

9. A non-transitory machine-readable medium encoded with executable instructions that, when executed, cause a primary node in an industrial control system to:
  detect that a backup node is available and unconfigured, the primary node and the backup node connected to a network and to a separate redundant path that connects the primary node directly to the backup node, wherein the step of detecting the backup node includes at least one of:
    detecting a signal level on a backplane,
    detecting a broadcast from the backup node,
    detecting a configuration message from the backup node, and
    detecting the physical connection of the backup node to the redundant path;
  upon detecting the backup node;
  query an identification from the backup node;
  receive the identification of the backup node;
  verify that the identification corresponds to hardware compatible with the primary node, wherein the identification indicates at least one of:
    identical hardware as the primary node,
    non-identical but functionally compatible hardware as the primary node, and
    an emulation of hardware that is identical to or functionally compatible with the primary node;
  automatically replicate the primary node to the backup node, including replicating a personality of the primary node to the backup node, wherein the step of the automatic replicating includes:
  sending a boot image to the back-up node followed by a command from the primary node to the backup node to initiate a boot sequence,
  sending one or more applications from the primary node to the backup node for execution on the backup node to replicates the personality and the operations of the primary node.

10. The non-transitory machine-readable medium of claim 9, wherein the personality includes a configuration that causes the backup node to be configured according to the primary node, or the personality includes one or more applications for execution on the backup node so that the backup node replicates operations of the primary node.

11. The non-transitory machine-readable medium of claim 9, wherein the backup node is activated to replace the primary node.

* * * * *